(12) United States Patent
Kawakami et al.

(10) Patent No.: US 6,709,491 B2
(45) Date of Patent: Mar. 23, 2004

(54) GAS SEPARATION MEMBRANE AND METHOD OF PRODUCING THE SAME

(75) Inventors: Hiroyoshi Kawakami, Tokyo (JP); Shoji Nagaoka, Kanagawa (JP); Yoshiaki Suzuki, Tokyo (JP); Masaya Iwaki, Niiza (JP)

(73) Assignee: Riken, Saitama (JP)

(*) Notice: Subject to any disclaimer, the term of this patent is extended or adjusted under 35 U.S.C. 154(b) by 0 days.

(21) Appl. No.: 10/227,297

(22) Filed: Aug. 26, 2002

(65) Prior Publication Data

US 2003/0089235 A1 May 15, 2003

(30) Foreign Application Priority Data

Aug. 27, 2001 (JP) .......................... 2001-255589

(51) Int. Cl.$^7$ .......................... B01D 71/64; B01D 69/10
(52) U.S. Cl. .......................... 96/4; 96/13; 96/14; 55/524; 55/DIG. 5
(58) Field of Search .......................... 95/45–55; 96/4, 96/8, 10, 13, 14; 55/524, 528, DIG. 5

(56) References Cited

U.S. PATENT DOCUMENTS

| | | | | |
|---|---|---|---|---|
| 3,846,521 A | * | 11/1974 | Osterholtz | 264/423 |
| 4,705,540 A | * | 11/1987 | Hayes | 95/51 |
| 4,717,393 A | * | 1/1988 | Hayes | 95/51 |
| 4,717,394 A | * | 1/1988 | Hayes | 95/49 |
| 4,746,474 A | * | 5/1988 | Kohn | 264/41 |
| 4,880,442 A | * | 11/1989 | Hayes | 95/51 |
| 4,929,405 A | * | 5/1990 | Kohn | 264/41 |
| 4,932,983 A | * | 6/1990 | Hayes | 95/51 |
| 4,952,220 A | * | 8/1990 | Langsam et al. | 96/13 |
| 4,976,897 A | * | 12/1990 | Callahan et al. | 264/425 |
| 4,988,371 A | * | 1/1991 | Jeanes et al. | 95/53 |
| 5,042,992 A | * | 8/1991 | Blinka et al. | 95/51 |
| 5,045,093 A | * | 9/1991 | Meier et al. | 95/47 |
| 5,061,298 A | * | 10/1991 | Burgoyne, Jr et al. | 95/54 |
| 5,073,175 A | * | 12/1991 | Anand et al. | 95/51 |
| 5,074,891 A | * | 12/1991 | Kohn et al. | 95/47 |
| 5,076,816 A | * | 12/1991 | Avrillon et al. | 95/51 |
| 5,178,940 A | * | 1/1993 | Matsumoto et al. | 96/13 |
| 5,248,319 A | * | 9/1993 | Ekiner et al. | 95/54 |
| 5,266,100 A | * | 11/1993 | Simmons | 95/43 |
| 5,409,524 A | * | 4/1995 | Jensvold et al. | 96/8 |
| 5,674,629 A | * | 10/1997 | Avrillon | 428/473.5 |
| 5,817,165 A | * | 10/1998 | Hachisuka et al. | 96/4 |
| 5,969,087 A | * | 10/1999 | Maeda | 528/353 |
| 5,976,284 A | | 11/1999 | Calvert et al. | 156/51 |
| 6,383,258 B1 | * | 5/2002 | Simmons | 95/45 |
| 6,464,755 B2 | * | 10/2002 | Nakanishi et al. | 95/52 |
| 6,497,747 B1 | * | 12/2002 | Ding et al. | 95/45 |

FOREIGN PATENT DOCUMENTS

| | | |
|---|---|---|
| EP | 0364628 | 4/1990 |
| JP | 8-25602 | 1/1996 |
| WO | WO97/18944 | 5/1997 |
| WO | WO97/45497 | 12/1997 |
| WO | WO01/97957 | 12/2001 |

OTHER PUBLICATIONS

English Language Abstract of JP 8–25602.
Hiroyoshi Kawakami et al., ASAIO Journal, vol. 42, No. 5 M871–76 (1996).
Hiroyoshi Kawakami et al., ASAIO Journal, vol. 43, No. 5 M490–94 (1997).
137 Journal of Membrane Science 241–50 (1997).

* cited by examiner

Primary Examiner—Robert H. Spitzer
(74) Attorney, Agent, or Firm—Greenblum & Bernstein, P.L.C.

(57) ABSTRACT

The object of the present invention is to provide a novel gas separation membrane having a high gas permeability and a high gas selectivity, and a method of producing the same. The present invention provides a gas separation membrane comprising a polymeric material soluble in an organic solvent, wherein at least a part of the surface is modified by ion bombardment.

7 Claims, No Drawings

GAS SEPARATION MEMBRANE AND METHOD OF PRODUCING THE SAME

FIELD OF THE INVENTION

The present invention relates to a gas separation membrane which is usable for separating each gas component from a gas mixture containing two or more kinds of gas, and a method of producing the same.

DESCRIPTION OF THE RELATED ART

Gas separation membrane technologies are used in a wide range of fields such as separation of nitrogen and oxygen from air, separation of carbon dioxide and methane from natural gas, as well as dehumidifying treatment of gas for semiconductors. Further, studies have recently been made on other applications such as separation of carbon dioxide from combustion gas discharged from a power plant etc. Such gas separation membranes are produced by various methods.

As a gas separation membrane which is excellent in properties such as heat resistance, solubility and membrane fabricability, there has conventionally been known a cellulose acetate membrane, but the cellulose acetate membrane is not practically satisfactory since it has poor chemical resistance and poor heat resistance. In addition, as a separation membrane having an improved heat resistance, a polysulfone semipermeation membrane is commercially produced, though it is not satisfactory due to its insufficient permeability. Further, a silicone membrane is known as an oxygen selective permeation membrane, but silicone is not industrially satisfactory since a sufficient mechanical strength cannot be obtained. Further recently, study has been started on an aromatic polyimide resin which has high elastic modulus, high strength, low expansibility and excellent heat resistance. However, from a practical standpoint, importance is placed on selective separation ability and heat resistance, and thus an aromatic polyimide resin which satisfies solubility to various solvents and workability has not been obtained. Therefore, a practical gas separation membrane has not yet been obtained because of difficulties in effecting a defectless thin membrane.

As practical properties of a gas separation membrane, high permeability rate and high selective separation ability are particularly required, but at present there has been no report on a gas separation membrane which simultaneously satisfies these two conditions.

SUMMARY OF THE INVENTION

An object of the present invention is to provide a novel gas separation membrane having high gas permeability and high gas selectivity, and a method of producing the same.

The inventors of the present invention have made intensive studies to achieve the above object. As a result, they have found that both high gas permeability and high gas selectivity can be simultaneously accomplished by using a membrane which is formed from polymeric material soluble in an organic solvent and has a surface modified by ion bombardment, for separating a gas mixture. Thus, they have completed the present invention.

According to the present invention, there is provided a gas separation membrane comprising a polymeric material soluble in an organic solvent, wherein at least a part of the surface is modified by ion bombardment.

Preferably, the polymeric material is polyimides, polyethers, polyesters, or polyamides. Particularly preferably, the polymeric material is fluorine-containing polyimides.

Preferably, the gas separation membrane of the present invention has an asymmetric structure composed of a non-defective surface skin layer and a porous layer which supports the surface skin layer, and at least a part of the surface of the surface skin layer is modified by ion bombardment.

The asymmetric structure composed of a non-defective surface skin layer and a porous layer which supports the surface skin layer in the gas separation membrane of the present invention is preferably formed by casting on a support a solution obtained by dissolving the polymeric material in a solvent mixture composed of a good solvent with a low boiling point, a good solvent with a high boiling point and a poor solvent, evaporating the solvent from a surface thereof, and conducting immersion into a coagulation bath to induce phase separation.

Preferably in the present invention, the modification by ion bombardment is conducted by ion implantation in a dose $\phi$ range of $1 \times 10^{10}$ ions/cm$^2 \leq \phi \leq 1 \times 10^{16}$ ions/cm$^2$.

According to another aspect of the present invention, there is provided a method of producing a gas separation membrane which comprises conducting ion implantation in a dose $\phi$ range of $1 \times 10^{10}$ ions/cm$^2 \leq \phi \leq 1 \times 10^{16}$ ions/cm$^2$ on at least a part of a surface of a polymeric material soluble in an organic solvent.

Preferably, the method of producing a gas separation membrane according to the present invention comprises the steps of:

casting on a support a solution obtained by dissolving the polymeric material in a solvent mixture composed of a good solvent with a low boiling point, a good solvent with a high boiling point and a poor solvent;

evaporating the solvents from a surface thereof;

conducting immersion into a coagulation bath to induce phase separation, thereby forming a membrane having an asymmetric structure composed of a non-defective surface skin layer and a porous layer which supports the surface skin layer; and conducting ion implantation in a dose $\phi$ range of $1 \times 10^{10}$ ions/cm$^2 \leq \phi \leq 1 \times 10^{16}$ ions/cm$^2$ on at least a part of a surface of the membrane.

DETAILED DESCRIPTION OF INVENTION

Hereinafter, embodiments of the present invention will be explained in detail.

A gas separation membrane of the present invention is characterized in that it comprises a polymeric material soluble in an organic solvent and at least a part of the surface thereof is modified by ion bombardment.

The gas separation membrane of the present invention can be used for separating and/or concentrating a specific component such as hydrogen gas, carbon dioxide gas, oxygen gas, nitrogen gas, water vapor, organic matter gas, and organic matter vapor, from a gas mixture.

The polymeric material to be used in the present invention is not particularly limited and any material may be employed, as long as the material is soluble in an organic solvent and is fabricable to form a membrane. Preferred examples of the polymeric material in the present invention include polyimides (including fluorine-containing polyimides), polyethers (polyether, polyether sulfone, polyether ketone and the like), polyesters, and polyamides. Fluorine-containing polyimides are particularly preferred.

Polyimides are obtained generally by polycondensation of tetracarboxylic acid dianhydride and diamine in equimolar amount, and are polymers having a repeating unit of a structure formed by imide-binding of a quadrivalent structural portion derived from tetracarboxylic acid dianhydride and a divalent structural portion derived from diamine component. In the present invention, it is particularly preferable to use a fluorine-containing polyimide containing at least one —$CF_3$ group in the repeating molecular structure unit. Since aromatic polyimides are generally insoluble and infusible, the formation of a membrane of aromatic polyimides is difficult. The fluorine-containing polyimide exhibits excellent solubility in an organic solvent, and therefore it has an advantage to readily form a microthin membrane.

In the present invention, the fluorine content of the fluorine-containing polyimide resin is not particularly limited. The number of fluorine atoms in the repeating molecular structural unit is preferably 6 to 12 in order to obtain a gas separation membrane having substantially stable high quality.

Examples of polyimides (including fluorine-containing polyimides) which can be used in the present invention include polymers having repeating units represented by the following structures, wherein the subscript n represents the number of repeating units.

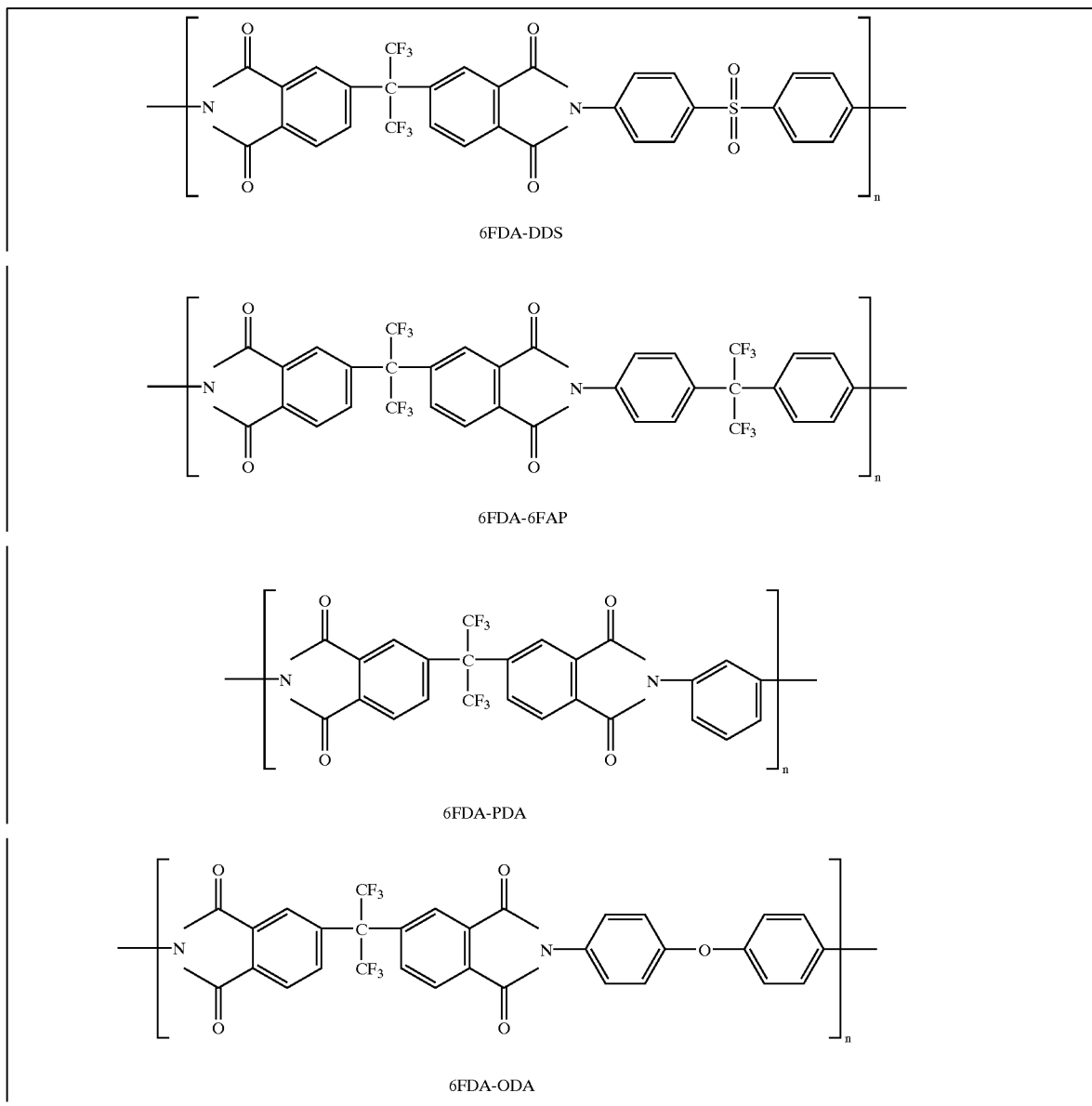

6FDA-DDS

6FDA-6FAP

6FDA-PDA

6FDA-ODA

-continued

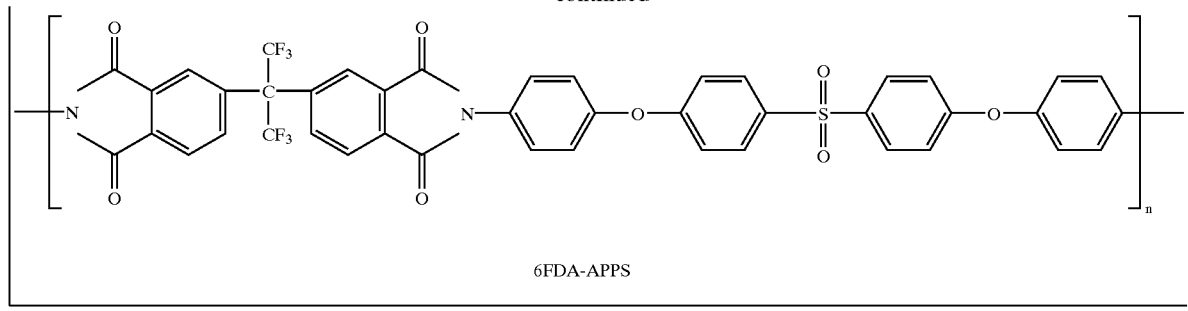

6FDA-APPS

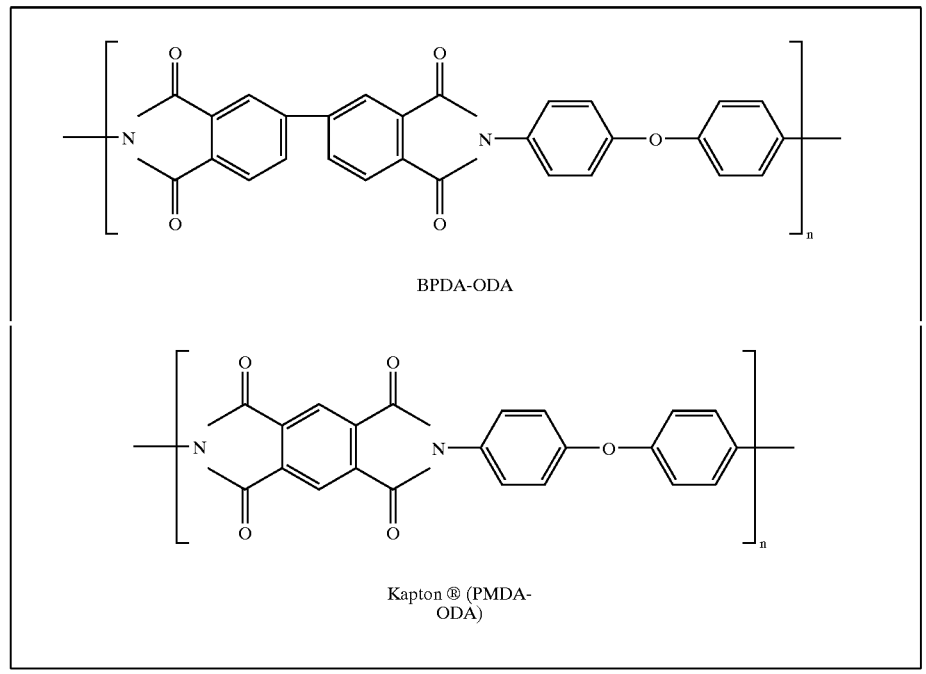

BPDA-ODA

Kapton ® (PMDA-ODA)

The fluorine-containing polyimides used in the present invention can be prepared using tetracarboxylic acid dianhydride and a diamine compound by a known polymerization method. For example, almost equimolar amounts of tetracarboxylic acid dianhydride and a diamine compound are stirred in a polar solvent at about 80° C. or less, preferably 0 to 60° C. for polymerization, thereby obtaining polyamic acid. The polar solvent used here is not particularly limited, and preferable examples thereof include N-methyl pyrrolidone, pyridine, dimethylacetamide, dimethylformamide, dimethylsulfoxide, tetramethylurea, phenol, cresol, and tetrahydrofuran.

An imidization accelerator such as a tertiary amine compound such as trimethylamine, triethylamine or pyridine, acetic anhydride, thionyl chloride, or carbodiimide is added to the obtained polyamic acid polar solvent solution, and the resultant mixture is stirred at a temperature of 5 to 150° C. for imidization. To bring about imidization reaction, the above polyamic acid solution may be heated at a temperature of 100 to 400° C., preferably 120 to 300° C. without the addition of the imidization accelerator.

After the imidization reaction, in order to remove the polar solvent used for polymerization and the imidization accelerator, purification is conducted by dropping the obtained solution into a large amount of solution such as acetone, alcohols or water, thereby obtaining a polyimide resin which is suitable for a membrane material. When imidization reaction is carried out without the addition of the imidization accelerator, polyamic acid powder obtained by dropping the polyamic acid solution into a large amount of solution such as acetone or alcohols, or alternatively polyamic acid solid obtained by evaporating the solvent from the polyamic acid solution (for evaporation, polyamic acid powder may be formed by adding a precipitant or the like, and then filtrated) is heated at a temperature of 100 to 400° C. for imidization, thereby affording a polyimide which is suitable for a membrane material.

The concentration of the polyimide solution in a solution for membrane formation is 3 to 40% by weight, preferably 10 to 30% by weight. Further, in preparing the solution for membrane formation, if necessary, a swelling agent, a dispersing agent or a thickener etc. may be added thereto. As means for flow-casting the solution for membrane formation, for example, a doctor knife, a doctor blade or an applicator may be used. The shape of the membrane of the present invention is not particularly limited, and a membrane having a tube-shape (including a hollow fiber shape) or a flat shape is preferably used.

Preferably, the gas separation membrane of the present invention has an asymmetric structure composed of a non-defective surface skin layer and a porous layer which supports the surface skin layer, and at least a part of the surface of the surface skin layer is modified by ion bombardment. In the present specification, "asymmetric structure" means a membrane wherein one surface is a compact layer (that is, a surface skin layer), and an internal structure and the other back surface have a porous structure. This concept is well-known in the art.

The method for the production of asymmetric membranes are described in Hiroyoshi Kawakami, Control of Membrane Structure by a Phase Inversion Method, Membrane, Vol. 26, No. 3, p110–115 (2001), the Membrane Society of Japan; Hiroyoshi Kawakami, Synthesis and Properties of Asymmetric Fluorinated Polyimide Membrane Having High Gas Permeability, Journal of the Chemical Society of Japan (Chemistry and Industrial Chemistry), 2001, No. 5, p257–265; H. Kawakami et al., Journal of Membrane Science 137 (1997) 241–250; or the like.

Specifically, the asymmetric structure composed of a surface skin layer and a porous layer as described above can be formed, for example, by casting on a support a solution obtained by dissolving the polymeric material in a solvent mixture composed of a good solvent with a low boiling point, a good solvent with a high boiling point and a poor solvent, evaporating the solvent from a surface thereof, and conducting immersion into a coagulation bath to induce phase separation.

The good solvent with a low boiling point which can be used includes dichloromethane, acetone, and tetrahydrofuran (THF). The good solvent with a high boiling point which can be used includes 1,1,2-trichloroethane, N,N'-dimethylformamide (DMF), N,N'-dimethylacetoamide (DMAc), and dimethylsulfoxide (DMSO). The poor solvent which can be used includes linear alcohols having a carbon number of 1 to 6.

The concentration of polymeric material is set to be 5 to 30% by weight, the concentration of the good solvent with a low boiling point is set to be 20 to 95% by weight, the concentration of the good solvent with a high boiling point is set to be 0 to 30% by weight, and the concentration of the poor solvent is set to be 0 to 20% by weight, respectively. The polymeric material solution is cast on a glass plate, and immediately the membrane thickness is adjusted (for example, 50 to 500 $\mu$m) by a doctor blade. Thereafter, the polymeric material solution is left on the glass plate for 10 to 600 seconds so as to evaporate the solvent from the surface (dry-process). Immediately after that, it is immersed into a coagulation bath to induce phase separation (wet-process). The solvent of the coagulation bath is not particularly limited, as long as the solvent does not dissolve the polymeric material used herein such as fluorine-containing polyimide, but has compatibility with the solvent in the solution for membrane formation. Examples thereof include water, alcohols such as ethanol, methanol and isopropyl alcohol, and a mixture thereof. Water is particularly preferably used. The temperature of the coagulation bath at the time of conducting immersion-removal of the organic solvent in the solution for membrane formation is not particularly limited, and preferably the temperature of the coagulation bath is in the range of 0 to 200° C.

The membrane which is prepared in the above-mentioned process forms an asymmetric structure composed of a completely defect-free surface skin layer and a porous layer which supports it. The surface skin layer is easily controlled within a range of a few nm to about 500 $\mu$m by changing the production conditions.

At least a part of the surface of the gas separation membrane according to the present invention is modified by ion bombardment. Examples of means for providing ion bombardment in the present invention include ion implantation.

Surface area and surface layer processing technologies have been developed as methods for forming a surface area and surface layer having a new excellent function or a combined function. These technologies include a method for modifying only the surface layer of the base material without changing the properties of the base material and a method for forming a new layer on the surface of the base material. Ion implantation method (ion beam irradiation technique) is categorized as the former method, and it has already been established, for example, as a method for adding an impurity into silicon for the purpose of addition effect. Ion implantation method is defined as a method wherein the particles to be added are ionized in a high vacuum ($10^{-4}$ Pa) and accelerated at a rate of several tens of kV to several MV, and are added to a solid substrate.

Depending on the kinetic energy of the ions, the effects are classified into adhesion effect, sputtering effect and implantation effect. In vacuum deposition methods, an ion has an energy of about 1 eV or less. In a recently developed ion sputtering deposition method, the energy of a particle coming out of a substrate reaches 100 eV. This method exhibits a low deposition rate but excellent evenness and adhesion, as compared with conventional deposition methods. Examples of the methods wherein an ion within a range of energy of several tens of electronvolts (eV) is employed, include surface modification by plasma. When an ion having several tens of electronvolts is collided against a material surface, the material permeability is low and the reaction occurs only within surface vicinity. However, electrical discharge in a gas usually generates high energy electrons, and ultraviolet and visible rays from excited molecules. Further, the vacuum degree in the plasma is approximately $10^{-1}$ Pascal (Pa.), and ions other than the used gas are generated. These factors complicate plasma reaction, and at the same time cause difficulty in controllability. Furthermore, these reactions under the vacuum degree of approximately $10^{-1}$ Pascal (Pa.) have extremely high concentrations of active species, thus causing a high density of chemical changes.

An example of the membrane formation method for forcibly increasing energy of deposition particles is the ionized plating method. In this method, some parts of the deposition particles are ionized, and forcibly accelerated in the electrostatic field, and irradiated onto a substrate surface, thereby forming a membrane. The ratio of the ionized particles to the total particles is approximately 5%. The ionization of evaporation particles is carried out using a shower of electrons or electrical discharge by a high frequency. Due to these accelerated ions, deposition membrane atoms and substrate atoms are mixed. Also the evenness of the membrane surface is increased and the membrane becomes closely-packed. The electrostatic voltage for ion acceleration is in a range of tens of volts to several kilovolts. Neutral particles and ions are mingled among the particles used in this technique, and therefore the particles have a wide kinetic energy. Accordingly, this causes various actions such as membrane formation by adhesion effect at a low energy level and scraping by sputtering at a medium energy level.

A method employing only ions for uniformizing energy of the particles, that is, a method wherein the particles are accelerated to have a constant energy and irradiated onto a substrate, is considered to be a right way for the ion beam technique. When particles are accelerated with several kilovolts and irradiated onto a substrate, the particles penetrate into the surface layer, but the effect of the surface being scraped is large. Even several kilovolts of energy bring about ion implantation effect.

When ions are accelerated with several kV and irradiated onto a substrate, the substrate surface layers are damaged. A method for lowering the damage as little as possible is the utilization of ions of low energy. Ions of low energy is characterized in that it has a large adhesion effect and utilizes particles having uniform energy. Among surface treatment techniques using ion beams, the ion implantation method is a method using the highest energy.

When ion beam is irradiated onto a polymeric material, unlike irradiation onto metal materials, semiconductors etc., there exist various problems. In particular, it is necessary to pay attention to the following points.

(1) Many polymeric materials are prone to be denatured and decomposed with temperature, and thus there is a limitation for the upper point of ion beam current.

(2) Since polymeric materials are insulating materials, there is a possibility that the surface is electrically charged by irradiated ions and the irradiation doses cannot be precisely measured.

(3) Gas discharge caused by decomposition of polymer bindings by ion beam irradiation occurs, and the vacuum system of an ion implantation device is damaged.

Further, the features of the ion implantation method will be described below.

(1) Since the method is a particle addition process under a non-thermal equilibrium, even an insoluble element can be added, and a soluble element can be added in an amount more than its solubility. The combination of the element to be added and the substrate (target) to which the element is added is completely unrestricted.

(2) Though the depth of the particles to be added depends on an ion to be added and a substrate to which the ion is added, it can be controlled by acceleration energy.

(3) The number of particles to be added (implantation amount) can be controlled by ion beam current and implantation period.

(4) Since only ions of interest can be selected, the particles to be added have a good purity, and scanning with an ion beam enables uniform particle addition over the whole area of a target substrate surface.

(5) By the use of masking with utilizing straightness of ion beam, an area to which particles are added and an area to which particles are not added can be easily distinguished.

As disclosed in Japanese Patent Application Laying-Open (kokai) No. 8-24602, it has been reported that attempts were made to improve gas permeability by the use of plasma irradiation. However, attempts employing ion implantation method have decisive differences in terms of energy irradiation method and controllability of ions.

When an ion beam is irradiated onto a polymeric material, the penetrated ions collide with base material atoms and thereby lose their energy, finally coming to a halt. In that process, cleavage of bindings and new binding occur. In general, when nuclear stopping power is dominant, occurrence of a defect such as a radical and changes of conformation, density, and morphology are observed. When electron stopping power is dominant, it is considered that cleavage and crosslinking of branched-chains occur along with electronic excitation. The polymeric material has a inter-atom binding energy of approximately several eV. The ion beam irradiation gives to the base material an energy amount of several tens of eV/Å per unit length. That is ten-times or more energy flux as compared to the binding energy. It is observed that the physical properties of the polymeric material are changed by irradiating this energy flux. These phenomena are varied depending on the kinds of ion beam, accelerated energy, irradiation amount and kinds of base material. When ion beam is irradiated onto the polymeric material, it is necessary to avoid increasing the beam current too much because the polymeric material is vulnerable to heat. Further, the polymeric material is an electrically insulating material, and thus attention must be paid to the fact that there is a possibility that a precise implantation amount cannot be measured by current measurement.

Examples of ion species to be implanted in the present invention include $H^+$, $He^+$, $C^+$, $N^+$, $O^+$, $Na^+$, $N_2^+$, $O_2^+$, $Ar^+$, and $Kr^+$, although the ion species are not particularly limited thereto unless they cause excessive destruction of a structure of the polymeric membrane.

The dose $\phi$ is preferably in the range of $1\times10^{10}$ ions/$cm^2 \leq \phi \leq 1\times10^{16}$ ions/$cm^2$. When the dose is lower than $10^{10}$ ions/$cm^2$, an improvement effect of gas permeability is lowered. When the dose is higher than $10^{16}$ ions/$cm^2$, polymeric materials are likely to be destructed. Thus, neither thereof is preferred. The dose $\phi$ is more preferably in the range of $1\times10^{11} \leq \phi \leq 1\times10^{14}$ ions/$cm^2$.

Regarding the ion accelerating energy, the degree thereof may cause differences in the energy transfer mechanism. In practice, the energy level can be set in the range of about several MeV or less, preferably about 2 MeV or less.

The beam current density is desirably set in a range not exceeding approximately 3 $\mu A/cm^2$. This is because an excessive beam current density would cause an excessive rise in temperature of the target polymeric material, thereby deteriorating the polymeric material and causing a possibility of lowering gas permeability.

A gas separation membrane enables gas separation with less energy and a smaller apparatus as compared with conventional gas separation and purification methods such as cryogenic method or adsorption method, and therefore much research has been made up to now. However, there has been no report so far on a polymer membrane having both of high gas permeability and high selectivity which are required for a gas separation membrane. An asymmetric fluorine-containing polyimide membrane obtained according to the present invention is the first polymer membrane which satisfies both properties.

For example, an $O_2/N_2$ separation membrane is expected to be applicable for the separation of oxygen or nitrogen from air, an oxygen enriching membrane for medical use, an oxygen enriching membrane for combustion use, or the like. However, in practice, cryogenic method is employed for separation and purification of oxygen and nitrogen. Further, it is considered that energy efficiency can be remarkably improved and remarkably high energy saving can be realized by increasing oxygen concentration at the time of combustion, but an oxygen enriching membrane for combustion use has not yet come into practice.

If a $CO_2/N_2$ separation membrane can separate $CO_2$ which is a main component of combustion gases and has a greenhouse effect with higher selectivity as compared with $N_2$, $CO_2/N_2$ separation membrane comes to have a novel application for gas separation membranes as a separation membrane for greenhouse effect gas.

A $CO_2/CH_4$ separation membrane is used for $CH_4$ purification from natural gas, and is considered to be usable for $CH_4$ purification from land field gas. A polymer membrane such as polyimide is used for $CH_4$ purification from natural gas, but its selectivity degree is approximately 60 and sufficient separation property is not necessarily exhibited.

Furthermore, the present invention is applicable to an $H_2$ separation membrane and thus applicable to any type of gas separation membrane.

The selectivity degree of conventional $O_2/N_2$ separation membrane is approximately 5, that of conventional $CO_2/N_2$ separation membrane is approximately 30, and that of conventional $CO_2/CH_4$ separation membrane is approximately 60. The selectivity degrees of the gas separation membranes according to the present invention are respectively 12, 100 and 200 for $O_2/N_2$ separation, $CO_2/N_2$ separation and $CO_2/CH_4$ separation. It is understood that the gas selectivity is dramatically improved.

The present invention will be described below in detail by referring to examples. The present invention is not limited by examples.

EXAMPLE

Example 1

Synthesis of Fluorine-Containing Polyimide

Using dimethylformamide (DMAc) as a polymerization solvent, 5.33 g (0.012 mol) of 2,2'-bis(3,4-carboxyphenyl) hexafluoropropane (6FDA) and 2.97 g (0.012 mol) of 3,3'-diaminodiphenylsulfone were adjusted to be equimolar, and both monomers were then dissolved into DMAc (35.4 ml) so that their weights became 15 wt %. The mixture was reacted for 15 hours under a nitrogen atmosphere to synthesize polyamide acid. Then, acetic anhydride and triethylamine were added (five-times moles of the monomers), and chemical imidization reaction was carried out for 24 hours to synthesize the fluorine-containing polyimide of interest.

Example 2

Preparation of Asymmetric Fluorine-Containing Polyimide Membrane

Fluorine-containing polyimide (12% by weight) was dissolved in a mixed solvent of dichloromethane (55% by weight), 1,1,2-trichloroethane (23% by weight) and butanol (10% by weight). The obtained fluorine-containing polyimide solution was cast on a glass plate, and immediately it was adjusted by a doctor blade so as to have a membrane thickness of 250 $\mu$m. Thereafter, it was allowed to stand for 15 seconds on the glass plate so as to evaporate the solvent from the surface. Then, it was immediately immersed into a coagulation bath (methanol) to induce phase separation. The prepared membrane had an asymmetric structure composed of a complete non-defective surface skin layer on its surface and a porous layer which supports the surface skin layer, and the surface skin layer had a thickness of approximately 10 nm.

Example 3

Ion Implantation into Samples

Using a 200 kV ion implantation apparatus (The Institute of Physical and Chemical Research), a sample having a square of 30 mm (asymmetric fluorine-containing polyimide membrane obtained in Example 2) was irradiated with a dose of 1E12 ($1 \times 10^{12}$) ions/cm$^2$, at an ion beam current of 3 $\mu$A/cm$^2$ or less, and with an acceleration energy of 50, 100 or 150 keV.

Example 4

Measurement of Permeability of Asymmetric Fluorine-Containing Polyimide Membrane The measurement of gas permeability was conducted using a low-vacuum method-employing permeability rate analyzer manufactured by Rikaseiki Co., Ltd. Specifically, the pressure fluctuation of baratron gauge through a permeable cell was measured with time, and the gas permeability flow rate was calculated. The measurement pressure was 10 atmospheres or less, and the measurement temperature was within a range of 15 to 45° C.

The results are shown in Table 1 below. In Table 1, "control" refers to an asymmetric fluorine-containing polyimide membrane which was not subjected to ion implantation treatment, and its surface skin layer has a membrane thickness of about 2 $\mu$m. It was demonstrated that the gas permeability flow rate (Q) was increased for gas molecules with a small molecular size such as carbon dioxide and oxygen, but was decreased for gas molecules with a large molecular size such as nitrogen and methane, by subjecting the membrane to ion implantation treatment. It was obvious that the asymmetric fluorine-containing polyimide membrane which was subjected to ion implantation treatment exhibited different gas permeability depending on the molecular size of the gas. Consequently, the gas selectivity ($QO_2/QN_2$, $QCO_2/QN_2$, $QCO_2/QCH_4$) was remarkably increased as compared with the controls.

TABLE 1

|  | $QN_2$ | $QO_2$ | $QCH_4$ | $QCO_2$ | $QO_2/QN_2$ | $QCO_2/QN_2$ | $QCO_2/QCH_4$ |
|---|---|---|---|---|---|---|---|
| control | 2.17E−08 | 1.25E−07 | 4.27E−09 | 4.35E−07 | 5.76036 | 20.046 | 101.8735 |
| 1.00E+12 | 1.13E−08 | 1.31E−07 | 6.55E−09 | 1.24E−06 | 11.5929 | 109.7345 | 189.313 |

Unit for Q: [cm$^3$ (STP)/(cm$^2$ sec cmHg)]

From the results shown in Table 1, it can be understood that the gas separation membrane of the present invention has both a high gas permeability and a high gas selectivity.

EFFECT OF THE INVENTION

According to the present invention, there is provided a novel gas separation membrane having a high gas permeability and a high gas selectivity, and a method of producing the same. The gas separation membrane of the present invention is applicable in energy-related fields, for example, as follows: use as an $O_2/N_2$ separation membrane so as to achieve energy saving; use as a $CO_2/CH_4$ separation membrane for purifying natural gas; or use of the membrane for hydrogen separation. Further, the gas separation membrane of the present invention is also applicable in environment-related fields, for example, as follows: use as a $CO_2/N_2$ separation membrane for collecting gases having a greenhouse effect; or use as a $CO_2/CH_4$ separation membrane for purifying methane from land-field gas. Furthermore, the gas separation membrane of the present invention is applicable in the fields of medicine-related fields, for example, as follows: use as an $O_2/N_2$ separation membrane for producing a membrane-type artificial lung; or use as an $O_2/N_2$ separation membrane for producing an in-home oxygen enriching device.

The present disclosure relates to subject matter contained in priority Japanese Patent Application No. 2001-255589, filed on Aug. 27, 2001, the contents of which is herein expressly incorporated by reference in its entirety.

What is claimed is:

1. A gas separation membrane comprising a polymeric material soluble in an organic solvent comprising at least one of polyimides, polyethers, polyesters, or polyamides, wherein at least a part of a surface of the membrane is modified by ion bombardment in the KeV to MeV range.

2. The membrane of claim 1, wherein the polymeric material comprises a fluorine-containing polyimide.

3. A gas separation membrane comprising a polymeric material soluble in an organic solvent, wherein the membrane has an asymmetric structure comprising a non-defective surface skin layer, wherein at least a part of a surface of the surface skin layer is modified by ion bombardment in the KeV to MeV range, and a porous layer that supports the surface skin layer.

4. The membrane of claim 3 formed by a method comprising: forming a solution comprising the polymeric material, a good solvent having a low boiling point, a good solvent having a high boiling point, and a poor solvent; casting the solution on a support; evaporating the solvent from a surface of the support; and immersing the support in a coagulation bath to induce phase separation.

5. A gas separation membrane comprising a polymeric material soluble in an organic solvent, wherein at least a part of a surface of the a surface skin layer is modified by ion implantation in a dose of $1\times10^{10}$ ions/cm$^2$ to $1\times10^{16}$ ions/cm$^2$.

6. A method of producing a gas separation membrane comprising conducting ion implantation on at least a part of a surface of a polymeric material soluble in an organic solvent in a dose of $1\times10^{10}$ ions/cm$^2$ to $1\times10^{16}$ ions/cm$^2$.

7. The method of claim 6, further comprising:
forming a solution comprising the polymeric material, a good solvent having a low boiling point, a good solvent having a high boiling point, and a poor solvent;
casting the solution on a support;
evaporating the solvent from a surface of the support; and
immersing the support in a coagulation bath to induce phase separation;
thereby forming the membrane with an asymmetric structure comprising a non-defective surface skin layer and a porous layer that supports the surface skin layer.

* * * * *

UNITED STATES PATENT AND TRADEMARK OFFICE
CERTIFICATE OF CORRECTION

PATENT NO. : 6,709,491 B2
DATED : March 23, 2004
INVENTOR(S) : H. Kawakami et al.

It is certified that error appears in the above-identified patent and that said Letters Patent is hereby corrected as shown below:

<u>Column 14,</u>
Line 5, after "of" (second occurrence) delete "the".

Signed and Sealed this

Eleventh Day of January, 2005

JON W. DUDAS
*Director of the United States Patent and Trademark Office*